3,240,518
JOINT ASSEMBLY

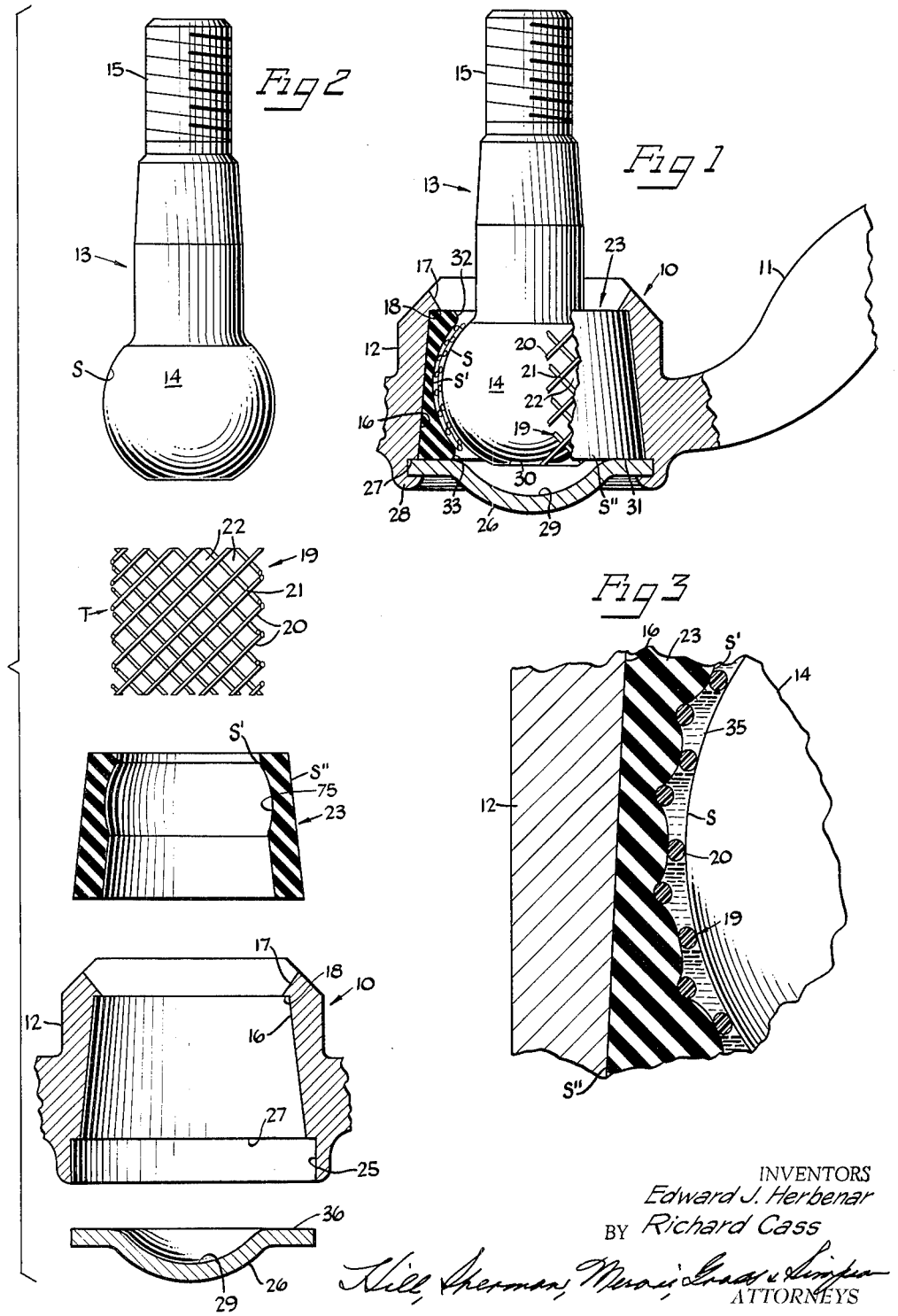

Edward J. Herbenar, Detroit, and Richard Cass, Beverly Hills, Mich., assignors to Thompson Ramo Wooldridge Inc., Cleveland, Ohio, a corporation of Ohio
Filed Jan. 10, 1963, Ser. No. 250,606
2 Claims. (Cl. 287—87)

This invention relates to a joint assembly and is more particularly directed to a pre-loaded joint assembly in which an open-mesh, or porous, fabric formed of a synthetic organic plastic material cooperates with one or the other of the relatively rotating members of a conventional ball type of joint to insure relative turning movement therebetween with a minimum torque requirement.

As is well known to those skilled in the art of ball type joints for use in automotive vehicles, the self-lubrication of such joints over prolonged years of service with assured safety of continued operation has presented many problems. It is only recently that automotive vehicle manufacturers have found themselves in a position to offer a five-year, or longer, warranty against failure of operation, since there has been no assurance that the heretofore used joint assemblies, such as those employed in the steering mechanisms and in the spring-suspended wheel mountings, could continue to operate satisfactorily and with safety over long periods of time without being properly lubricated at regular, relatively short intervals. The joint assemblies of our present invention are intended to solve the lubricating and other problems inherent in joint assemblies as heretofore constructed.

In accordance with our present invention, a joint assembly that includes a pair of relatively rotatable members has associated therewith an open-mesh sleeve of a self-lubricating plastic material in association with a bushing of an elastomeric material that is under load and that urges the plastic material into conforming surface contact and bearing relationship with one of said relatively rotatable members. Although a plastic material is selected that has self-lubricating properties, a conventional lubricant, such as grease, or any suitable lubricant, whether dry or wet, may be used to provide a film of lubricant between the plastic fabric and the associated joint member and to more-or-less completely fill the pores, or interstices, of the plastic fabric, and thereby provide a multitude of lubricant reservoirs. Where such conventional lubricant is used, the pre-loaded bushing of elastomeric material, being capable of cold flow under stress induced by the loading of the bushing, tends to flow into the pores, or interstices, of the plastic material and urge the film of lubricant from within said pores into wiping contact with the relatively rotatable joint member with which the plastic fabric is in conforming surface engagement.

Preferably, a plastic fabric screen formed of crisscrossed strands of plastic, bonded together at their intersections, is used, since such a fabric is not only flexible and when in tubular form may be expanded or contracted, but the strands of the fabric between the bonded intersections are themselves capable of displacement under the forces to which they are subjected in the joint assembly during use, and such displacement serves to insure, under the confining pressure of the preloaded elastomer bushing, a continuous film of lubricant over the surface of the relatively rotatable joint member in contact with the plastic fabric. The plastic screen, in effect, forms independent load-bearing cells that accommodate themselves to surface irregularities of the relatively rotatable member.

As previously indicated, however, a plastic material is chosen that has self-lubricating properties, so that even without an added conventional lubricant, continued freedom of relative rotation between the joint members with a minimum torque requirement is insured over a long period of useful life.

It is therefore an important object of this invention to provide an improved joint assembly construction having built-in self-lubricating characteristics that greatly prolong the useful service life of the joint and that obviate the need of introducing added lubricant into the joint from time to time.

It is a further important object of this invention to provide a simplified and relatively inexpensive joint assembly wherein no close tolerances are required of the relatively rotatable surfaces of the joint members and wherein the self-lubrication of the relatively moving bearing surfaces of the joint over many years of service is insured.

Still other and further objects and features of the present invention will become apparent to those skilled in the art from consideration of the following specification and the accompanying drawings, wherein:

FIGURE 1 is a vertical sectional view, with parts in elevation and parts broken away, illustrating a ball joint embodying the principles of our invention;

FIGURE 2 is an exploded view showing the various components of the ball joint of FIGURE 1, with some of the components in vertical elevation and others in vertical cross-section; and FIGURE 3 is a fragmentary, greatly enlarged sectional view, similar to that shown in FIGURE 1 but with a conventional lubricant disposed in contact with one of the relatively rotating surfaces of the joint.

As shown on the drawings:

As illustrated in FIGURE 1, a ball-type joint embodying the principles of our invention and indicated generally by the reference numeral 10, comprises an operating arm 11 providing a socket housing 12 at its free end, and a stud 13 having a ball end 14 within said socket housing 12 and having an upper threaded end 15. A ball joint such as illustrated in FIGURE 1 is particularly adapted for use in the steering linkage mechanism of an automotive vehicle, such as that which includes tie rods, drag links, reach rods, and the like.

Said socket housing 12 is formed with an inner, segmental-conical surface 16 that tapers inwardly toward its upper open end 17. Said upper open end 17 is formed with a downwardly restricted, sloping annular surface, the diameter of the lower portion of which is less than the diameter of the upper end of the socket 16 to provide a downwardly facing annular shoulder 18. With the ball end 14 of the ball stud 13 within the socket of the housing 12, the shank of said ball stud extends freely through the tapered opening 17 for limited angular movement with respect to the normal axis of said ball stud 13.

In the complete joint assembly illustrated in FIGURE 1, a sleeve of a tubular fabric 19 snugly encloses the ball end 14 in conforming surface engagement therewith.

The fabric 19 is preferably formed of strands of a synthetic organic plastic that has self-lubricating properties, that is relatively inert to oils and greases, and that has a relatively high tensile strength and high resistance to wear. As illustrated, the fabric 19 is composed of individual strands 20 that are arranged in a criss-cross fashion and that are bonded together at their points of intersection, as at 21, preferably by a thermal bonding of the plastic itself. The fabric 19 thus provides a multiplicity of openings 22 between the strands 20, which openings are relatively large and rectangular in shape, as shown, but may be of various sizes and geometrical shapes so long as they are large enough to function in the manner about to be described. One of the important features of the fabric 19 for my purposes is that it is available in tubular form of considerable length and of suitable diameter, so that a length and diameter can be chosen in accordance with the size of the ball or other relatively rotatable joint member. Also, it is important that the fabric be flexible and may be readily distorted, yet is sufficiently resilient to tend to return to its initial size and shape. For association with the ball end 14, an appropriate length and diameter of an open ended tube of the fabric 19, such as the tube T of FIGURE 2, can be expanded to slip it over the ball end, and so that after being slipped into place the fabric will tend to return to its original diameter and snugly engage the ball end in conforming surface contact therewith. The length of the tube T, after being stretched on to the ball end 14, is sufficient to be substantially coextensive with the segmental spherical portion S of the ball end 14.

Instead of an open-mesh fabric of criss-crossed strands, such as the fabric illustrated, other reticulated or foraminous fabrics may be employed, such as net, screen and other porous fabrics having openings or interstices that are sufficiently large to permit the passage therethrough of a viscous or semi-solid lubricant. Preferably, the openings or interstices are at least a sixteenth of an inch minimum dimension, and may be as large as one-eighth of an inch or a quarter-inch in maximum dimension.

As to the material of which the fabric 19 is formed, various synthetic organic plastics may be employed, such as nylon, which is a linear polymeric amide; "Celcon," which is a co-polymer of trioxane; "Delrin,"which is an acetal resin, or polymerized formaldehyde; "Marlex," which is a polyethylene; and polyurethane. These are only examples of various types of resins, or polymers, that may be used. In general, a resin should be selected that is available in the form of a netting or foraminous fabric, in open-ended tubular form and having a high degree of flexibility and considerable elasticity, together with the other properties of high tensile strength, inertness to oils and greases, and the like, as mentioned above.

With further reference to the joint illustrated in FIGURE 1, the assembly includes a bushing 23 formed of an elastomeric material, which is preferably a synthetic elastomer that is extremely resistant to deterioration and to attack by oils and greases. Various synthetic elastomers such as the butadiene-styrene, isobutylene isoprene, and butadiene-acrylonitrile copolymers; the polychloroprene and polysiloxane "rubbers;" the copolymers of vinylidene fluoride and hexafluoropropylene; the chlorosulfonated polyethylenes; and the polyurethanes may be used, and, also, natural elastomers, such as natural rubber, as will be well understood by those versed in this art. An important feature of the elastomer to be chosen is that it have good cold-flow properties over the wide ranges of temperature to which the joint assembly may be exposed in service. In general, elastomers having a Durometer A hardness of from 40 to 70 have desirable cold-flow properties for our purposes, but we do not desire to be limited to this range.

The bushing 23 is preferably a one-piece annulus that, as shown in the exploded view of FIGURE 2, is preformed as a truncated hollow cone of substantially uniform wall thickness but provided with an inner segmental spherical surface portion 75 for initial positioning of the ball end 14 therein. The dimensions of the bushing 23 are such that, with some stretching thereof, the ball end 14, with the tubular fabric 19 positioned thereon or already positioned in the bushing, can be inserted into the conforming segmental spherical surface portion 75 of said bushing 23. This partial assembly is then inserted, the threaded shank end 15 first, through the larger open end of the socket housing 12, until the bushing 23 is in conforming surface contact with the socket 16 with its upper end abutting against the inturned annular shoulder 18.

At this stage of the assembly of the joint, the socket housing is in the form illustrated in the exploded view of FIGURE 2, with its lower end provided with a cylindrical opening 25 of larger diameter than the lower end of the downwardly flared housing surface 16. A closure plate 26 having an outer diameter substantially the same as that of the opening 25 is then inserted in said opening to abut the downwardly facing, annular shoulder 27. Thereafter, the lower annular wall of the housing 12 is peened over inwardly, as at 28, to securely retain the plate 26 in abutment against the annular shoulder 27. The closure plate, or disc, 26 is preferably formed with a downwardly concave, inner central portion 29 to provide clearance for the lower end 30 of the ball end 14 while leaving an outer annular marginal portion 31 on the disc 26 for abutment against the lower end of the bushing 23.

As previously indicated, the bushing 23 is so dimensioned that it may be slipped over the fabric 19 after the latter is inserted in place on the ball end 14, and is also so dimensioned as to be insertable at that stage of the assembly in the socket housing 12 to conform to the inner surface 16 thereof and abut the upper inturned shoulder 18. When so inserted, however, the bushing 23, because of its initial greater length than the length of the inner housing surface 16, and also because of the normal volume requirements of the bushing 23, more than fills the space available to it within the length of the surface 16. Consequently, prior to the positioning in place of the closure disc 26, the lower end of the bushing 23 extends downwardly beyond the lower end of the inner surface 16 represented by the shoulder 27. Consequently, when the disc 26 is forced into place, it exerts a compressive force, or load, upon the bushing 23, with the result that the material of said bushing 23 flows radially inwardly at its upper end, as at 32, to provide a constricted annular neck portion, and also flows radially inwardly at its lower end, as at 33, to form a similar constricted annular neck portion. The result of such flow is that the inner surface S' of said bushing 23 tends to press the fabric sleeve 19 into close surface-conforming engagement with the surface S of the ball end. Additionally, as will be more clearly shown in the enlarged view of FIGURE 3, the extent to which the bushing 23 is placed under load is sufficient to cause the material of the bushing to enter into the openings 22 in the fabric sleeve 19 and become interlocked with the strands 20 so as to preclude relative rotation between said bushing 23 and the fabric sleeve 19.

The joint assembly of FIGURE 1 utilizes the self-lubricating properties of the plastic material of which the fabric sleeve 19 is formed, and will be found operative over relatively long periods of time without the use of an added lubricant. Relative rotation takes place solely between the surface S of the ball end 14 and the fabric sleeve 19, with the surface S' of the bushing 23 urging the fabric sleeve into relatively frictionless surface engagement with said surface S and without the material of said bushing 23, itself, actually coming in contact with said surface S. With the bushing 23 under load, there is sufficient frictional surface engagement between its outer surface S" and the socket wall 16 to prevent relative rotation between the bushing surface S" and the inner surface 16 of the housing. In addition to the accommodation of the relative rotational movement between the ball end 14 and the socket housing 12, the construction and arrangement of the joint assembly is such that tilting or angular movement of the ball stud 13 is also accommodated between the ball surface S and the fabric sleeve 19, with said fabric sleeve held relatively stationary because of being in interlocking engagement with the bushing 23.

While the joint assembly of our invention is operable, as described, without the use of an added lubricant, an added lubricant may be employed to advantage in our joint assembly. FIGURE 3 illustrates by an enlarged sectional view the relationship of parts when a lubricant, such as grease, is employed. In that case, a grease film 35 is formed that fills the openings or interstices between the strands 20 of the fabric sleeve 19. Due to the tendency of the elastomeric material of which the bushing 23 is formed to flow under compression, the inner surface S' of said bushing flows inwardly into partially surrounding surface contact with some of the strands 20 and also flows into the openings between the strands, thereby urging both the fabric sleeve 19 and the lubricant film 35 toward the segmental spherical surface S of the ball end 14. There is thus an interlocking, as previously referred to, between the material of the bushing 23 and the strands of the fabric sleeve 19. This interlocking holds the fabric sleeve 19 relatively stationary, yet permits, under the stresses set up by the rotation and/or tilting of the ball stud 13, a certain amount of displacement of the strands 20, with a resultant distortion of the pattern of the strands and of the openings 22 therebetween. Such distortion of the pattern of the fabric sleeve and the resulting movement of the strands of the sleeve relative to the ball surface S makes for more efficient lubrication of said ball surface and consequently reduces the amount of turning force, or torque, required for relative rotation of the primary members 11 and 13 of the joint 10. Even where, as in FIGURE 3, certain of the strands 20 of the fabric sleeve 19 seem to be in direct contact with the ball surface S, there is probably a continuous film of lubricant from the main body of lubricant 35 between said strands and said surface. Even in the absence of complete continuity, however, the self-lubricating properties of the plastic material of which the fabric sleeve 19 is formed insures a minimum of friction between the relatively rotating surfaces.

Since the fabric sleeve, is made of self-lubricating plastic material and is both flexible and to an extent resilient under the bearing load the segmental spherical surface S of the ball end 14 need not be held under close tolerances, and that, of course, also applies to the surface 16 of the housing 12. Relative rotational movement as well as limited tilting or angular movement is provided for with a minimum of frictional resistance to such movements between the surfaces involved, owing primarily to the self-lubricating properties of the fabric sleeve or, where an added lubricant is used, to the excellent lubricating properties resulting from the combination of the fabric sleeve and the pore-filling lubricant. The degree to which the elastomer bushing is pre-loaded may be easily varied to suit the torque and other requirements of the joint assembly. The size of the pores or openings in the fabric sleeve 19 may be varied in accordance with the extent of loading impressed upon the corresponding elastomer bushing, but, in general, with higher loading values, the pores or openings should be relatively smaller, and vice-versa, in order to insure a continuity of lubricant film where a lubricant is used.

The term "self-lubricating" is applied herein to materials that inherently exhibit an unusually low coefficient of friction.

It will be apparent to those skilled in the art that variations may be undertaken without departing from the novel concepts of the present invention, and in view thereof, it is our intention that the scope of the present invention be limited solely by the scope of the hereinafter appended claims.

We claim as our invention:
1. A ball joint assembly comprising:
a housing providing a substantially cylindrical socket initially open at opposite ends,
a ball stud having a ball on one end located within said socket and spaced from the wall defining the socket and having the stud projecting from one end of the socket, said opening at one end being reduced and defining a shoulder facing toward the opposite end of the socket,
a foraminous self-lubricating plastic liner surrounding said ball and comprising a sleeve of criss-crossed layers of spaced strands of self-lubricating plastic material with an inner layer of strands engaging the ball and extending at an angle to the axis of the stud and an outerlayer resting on the inner layer and extending at an angle to the axis of the stud so that the strands of the inner and outer layers intersect each other at an angle, the strands of the outer layer being bonded to the strands of the inner layer at the points of intersection,
the respective strands of the inner and outer layers being so spaced as to define openings through the sleeve of from $\frac{1}{16}$ of an inch to $\frac{1}{8}$ of an inch in dimension,
a preformed one-piece annular bushing of a solid resilient elastomeric material filling the space between the sleeve and the wall defining said socket and engaging said shoulder at one end and having its opposite end adjacent to said opposite end of the socket,
and a closure member secured to said housing across said opposite end of the socket and engaging said bushing so as to place it under an axial load towards said shoulder sufficient to effect a deformation and flowing of the bushing into said openings through the sleeve to interlock the sleeve with the bushing.
2. A ball joint assembly as defined in claim 1, including a lubricant on said ball and within said openings through said sleeve.

References Cited by the Examiner
UNITED STATES PATENTS

| | | | |
|---|---|---|---|
| 2,312,516 | 3/1943 | Alldredge | 287—85 |
| 2,324,984 | 7/1943 | Brown. | |
| 2,350,398 | 6/1944 | Hufferd. | |
| 2,424,914 | 7/1947 | Brown. | |
| 2,537,629 | 1/1951 | Brown. | |
| 2,804,886 | 9/1957 | White | 308—238 X |
| 2,824,773 | 2/1958 | Bontempi | 308—26 |
| 2,906,573 | 9/1959 | Runton | 287—90 X |
| 2,944,831 | 7/1960 | Thomas. | |
| 3,017,209 | 1/1962 | Thomas. | |
| 3,082,485 | 3/1963 | Thomas | 308—237 X |
| 3,101,961 | 8/1963 | White. | |
| 3,110,530 | 11/1963 | Herman | 308—238 |

CARL W. TOMLIN, *Primary Examiner.*

THOMAS F. CALLAGHAN, *Examiner.*